(12) United States Patent
Uenaka et al.

(10) Patent No.: US 12,198,868 B2
(45) Date of Patent: Jan. 14, 2025

(54) SOLID ELECTROLYTIC CAPACITOR ELEMENT AND SOLID ELECTROLYTIC CAPACITOR

(71) Applicant: Panasonic Intellectual Property Management Co., Ltd., Osaka (JP)

(72) Inventors: Keita Uenaka, Osaka (JP); Kei Hirota, Okayama (JP); Yuta Tomimatsu, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 18/004,424

(22) PCT Filed: Jul. 8, 2021

(86) PCT No.: PCT/JP2021/025719
§ 371 (c)(1),
(2) Date: Jan. 5, 2023

(87) PCT Pub. No.: WO2022/024702
PCT Pub. Date: Feb. 3, 2022

(65) Prior Publication Data
US 2023/0282425 A1    Sep. 7, 2023

(30) Foreign Application Priority Data
Jul. 30, 2020 (JP) ................. 2020-128836

(51) Int. Cl.
*H01G 9/042* (2006.01)
*H01G 9/15* (2006.01)

(52) U.S. Cl.
CPC ............ *H01G 9/0425* (2013.01); *H01G 9/15* (2013.01)

(58) Field of Classification Search
CPC .............................. H01G 9/0425; H01G 9/15
USPC ........................................ 361/523, 525, 532
See application file for complete search history.

(56) References Cited

U.S. PATENT DOCUMENTS

| | | | |
|---|---|---|---|
| 2008/0247120 A1 | 10/2008 | Mori et al. | |
| 2009/0015989 A1* | 1/2009 | Takatani | H01G 9/15 29/25.03 |
| 2012/0088160 A1* | 4/2012 | Zhang | H01M 10/0525 429/207 |

FOREIGN PATENT DOCUMENTS

JP    2008-258526    10/2008

OTHER PUBLICATIONS

International Search Report of PCT application No. PCT/JP2021/025719 dated Sep. 21, 2021.

* cited by examiner

*Primary Examiner* — Arun Ramaswamy
(74) *Attorney, Agent, or Firm* — Rimon P.C.

(57) ABSTRACT

A solid electrolytic capacitor element includes an anode body, a dielectric layer disposed on a surface of the anode body, a solid electrolyte layer covering at least a part of the dielectric layer, and a cathode lead-out layer covering at least a part of the solid electrolyte layer. The cathode lead-out layer includes a carbon layer that is in contact with the solid electrolyte layer and covers the at least the part of the solid electrolyte layer. The carbon layer includes a carbonaceous material and a transition metal ion component. A content proportion of the transition metal ion component in the carbon layer is 17000 ppm or less on a mass basis.

8 Claims, 1 Drawing Sheet

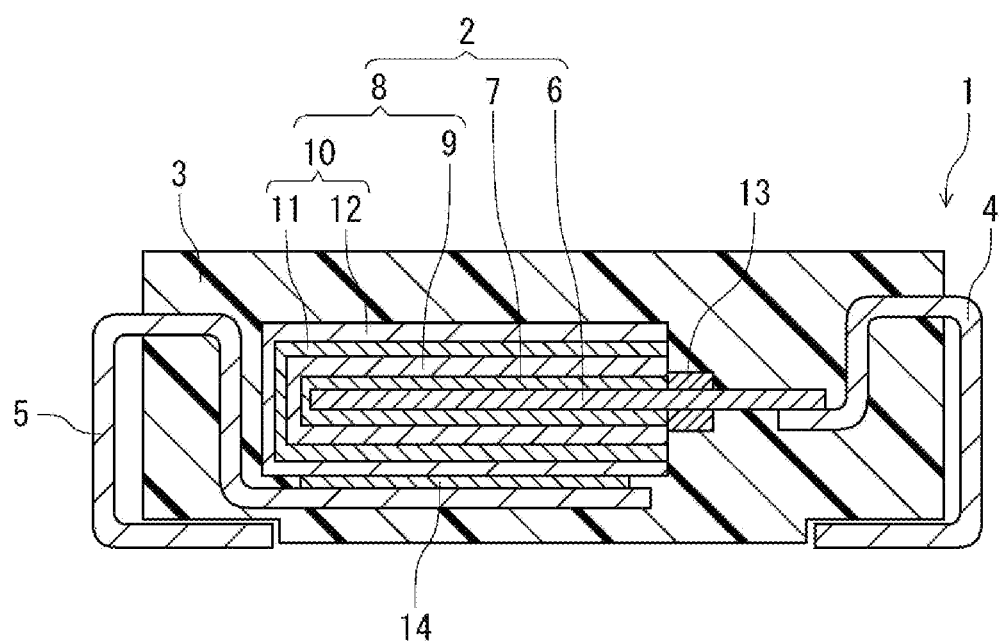

SOLID ELECTROLYTIC CAPACITOR ELEMENT AND SOLID ELECTROLYTIC CAPACITOR

TECHNICAL FIELD

The present disclosure relates to a solid electrolytic capacitor element and a solid electrolytic capacitor.

BACKGROUND

A solid electrolytic capacitor includes a solid electrolytic capacitor element, a resin exterior body or case that seals the solid electrolytic capacitor element, and an external electrode electrically connected with the solid electrolytic capacitor element. A solid electrolytic capacitor element includes an anode body, a dielectric layer disposed on a surface of the anode body, and a cathode part that covers at least a part of the dielectric layer. The cathode part includes a solid electrolyte layer and a cathode lead-out layer. The solid electrolyte layer covers at least a part of the dielectric layer and contains a conductive polymer. The cathode lead-out layer covers at least a part of the solid electrolyte layer. The cathode lead-out layer includes, for example, a carbon layer and a silver-paste layer.

Unexamined Japanese Patent Publication No. 2008-258526 proposes a solid electrolytic capacitor including a carbon layer that contains carbon particles and silicic acid and/or silicate.

SUMMARY

A solid electrolytic capacitor element according to one aspect of the present disclosure includes: an anode body; a dielectric layer disposed on a surface of the anode body; a solid electrolyte layer covering at least a part of the dielectric layer; and a cathode lead-out layer covering at least a part of the solid electrolyte layer. The cathode lead-out layer includes a carbon layer that is in contact with the solid electrolyte layer and covers the at least the part of the solid electrolyte layer. The carbon layer includes a carbonaceous material and a transition metal ion component. And a content proportion of the transition metal ion component in the carbon layer is 17000 ppm or less on a mass basis.

A solid electrolytic capacitor according to another aspect of the present disclosure includes at least one solid electrolytic capacitor element described above.

According to the present disclosure, initial equivalent series resistance (ESR) in the solid electrolytic capacitor can be kept low.

BRIEF DESCRIPTION OF THE DRAWINGS

FIG. 1 is a schematic sectional view illustrating a solid electrolytic capacitor according to one exemplary embodiment of the present disclosure.

DESCRIPTION OF EMBODIMENT

Prior to the description of exemplary embodiments, a problem in the prior art will be briefly described below.

In the solid electrolytic capacitor, when air enters the solid electrolytic capacitor, a conductive polymer is oxidized and degraded or a dopant contained in a solid electrolyte layer is decomposed by an action of moisture or oxygen contained in the air, so that the solid electrolyte layer is degraded, and conductivity of the solid electrolyte layer may be decreased. When the conductivity of the solid electrolyte layer is low, initial performance of the solid electrolytic capacitor decreases (For example, ESR increases or electrostatic capacity decreases.). Also, during the use of the solid electrolytic capacitor, the conductivity of the solid electrolyte layer decreases, leading to a decrease in performance of the solid electrolytic capacitor, such as an increase in ESR or a decrease in electrostatic capacity. Degradation of the solid electrolyte layer is remarkable particularly in a high-temperature environment. A solid electrolytic capacitor may be used in a high-temperature environment depending on use applications. Furthermore, the solid electrolytic capacitor is generally joined using solder to a substrate through a reflow step that is exposed to a high temperature. When the solid electrolytic capacitor is exposed to a high temperature, degradation of the solid electrolyte layer becomes more remarkable, and the decrease in conductivity becomes remarkable, so that the decrease in capacitor performance tends to become apparent.

In the solid electrolytic capacitor, a carbon layer is provided so as to cover at least a part of the solid electrolyte layer. The carbon layer is formed, for example, by applying a liquid or paste dispersion in which a carbonaceous material is dispersed in a liquid medium to a surface of the solid electrolyte layer and drying the dispersion. In order to obtain a dispersion in which a carbonaceous material is dispersed with high dispersibility, the dispersion is usually prepared by wet-pulverizing the carbonaceous material using a liquid medium and finely dispersing the carbonaceous material in the liquid medium. Wet pulverization is generally performed using a bead mill using stainless steel beads. It has found that, when wet pulverization is performed using stainless steel beads, a large amount of transition metal ions are mixed into the dispersion and the formed carbon layer. Transition metal ions may act as an oxidant. Thus, it has found that the presence of transition metal ions contained in the dispersion and the carbon layer causes to accelerate the oxidative degradation of the conductive polymer as described above.

In view of the above, in a solid electrolytic capacitor element according to one aspect of the present disclosure, in a carbon layer containing a carbonaceous material and a transition metal ion component, a content proportion of the transition metal ion component in the carbon layer is controlled to 17000 ppm or less on a mass basis. This makes it possible to reduce initial ESR of the solid electrolytic capacitor. Furthermore, even when the solid electrolytic capacitor is used and when the solid electrolytic capacitor is exposed to a high temperature, an increase in ESR can be suppressed to a low level. Thus, a solid electrolytic capacitor element and a solid electrolytic capacitor excellent in temporal stability and thermal stability are obtained. By enhancing the stability, the reliability of the solid electrolytic capacitor element and the solid electrolytic capacitor can be enhanced. It is considered that the ESR can be suppressed to a low level because an oxidation reaction of the conductive polymer is reduced, so that degradation of the solid electrolyte layer is reduced, and high conductivity of the solid electrolyte layer can be secured and maintained.

Hereinafter, the solid electrolytic capacitor and the solid electrolytic capacitor element (hereinafter, may be simply referred to as a capacitor element) of the present disclosure will be described more specifically with reference to the drawings as necessary.

[Solid Electrolytic Capacitor]

A solid electrolytic capacitor includes one or more capacitor elements. At least one of the capacitor elements included in the solid electrolytic capacitor may include a carbon layer in which the content proportion of the transition metal ion component is in the above range. It is preferable that 50% or more of the number of capacitor elements included in the solid electrolytic capacitor include a carbon layer in which the content proportion of the transition metal ion component is in the above range, it is more preferable that 75% or more of the number of capacitor elements include a carbon layer in which the content proportion of the transition metal ion component is in the above range, and it is still more preferable that all the capacitor elements include a carbon layer in which the content proportion of the transition metal ion component is in the above range.

(Capacitor Element)

(Anode Body)

The anode body may include a valve metal, an alloy containing the valve metal, a compound containing the valve metal, or the like. These materials can be used singly or in combination of two or more kinds thereof. As the valve metal, for example, aluminum, tantalum, niobium, and titanium are preferably used. The anode body having a porous surface can be obtained, for example, by roughening a surface of a base material (such as a foil-shaped or plate-shaped base material) containing the valve metal by etching or the like. The roughening can be performed by, for example, an etching treatment or the like. Furthermore, the anode body may be a molded body of particles that contain the valve metal or a sintered body of the molded body. Note that the molded body and the sintered body have a porous structure as a whole.

(Dielectric Layer)

The dielectric layer is an insulating layer that functions as a dielectric material formed so as to cover a surface of at least a part of the anode body. The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on the porous surface of the anode body, the dielectric layer is formed along an inner wall surface of a hole or a pit on the surface of the anode body.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and only has to be any one that functions as a dielectric material.

(Cathode Part)

The cathode part includes a solid electrolyte layer and cathode lead-out layers. The solid electrolyte layer covers at least part of the dielectric layer. The cathode lead-out layers cover at least part of the solid electrolyte layer. Usually, the cathode part is formed on at least a part of the surface of the anode body with the dielectric layer interposed between the cathode part and the cathode forming portion. Hereinafter, the solid electrolyte layer and the cathode lead-out layer will be described.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and it is sufficient that the solid electrolyte layer may be formed so as to cover at least a part of the dielectric layer. The solid electrolyte layer constitutes at least a part of the cathode part in the solid electrolytic capacitor.

The solid electrolyte layer contains a conductive polymer. The solid electrolyte layer may further contain at least one of a dopant and an additive agent as necessary.

As the conductive polymer, there can be used, for example, a known polymer used for a solid electrolytic capacitor, such as a π-conjugated conductive polymer. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. Among these polymers, for example, it is preferable to use polymer that adopts polypyrrole, polythiophene or polyaniline as a basic skeleton. The above-mentioned polymer also includes a homopolymer, a copolymer of two or more kinds of monomers, and derivatives of these polymers (a substitute having a substituent group group). For example, polythiophene includes poly(3,4-ethylenedioxythiophene) and the like.

As the conductive polymer, one kind may be used alone, or two or more kinds may be used in combination.

A weight-average molecular weight (Mw) of the conductive polymer is not particularly limited, and is, for example, in a range from 1,000 to 1,000,000, inclusive.

Note that, in the present specification, the weight-average molecular weight (Mw) is a value in terms of polystyrene measured by gel permeation chromatography (GPC). Note that usually, GPC is measured using a polystyrene gel column, and water and methanol (volume ratio 8:2) that form a mobile phase.

The solid electrolyte layer can further contain a dopant. As the dopant, for example, at least one selected from the group consisting of an anion and a polyanion is used.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid and naphthalenesulfonic acid.

As polyanion, for example, a polymer-type polysulfonic acid, and a polymer-type polycarboxylic acid and the like can be named. As the polymer-type polysulfonic acid, a polyvinylsulfonic acid, a polystyrenesulfonic acid, a polyallylsulfonic acid, a polyacrylsulfonic acid, a polymethacrylsulfonic acid and the like can be named. As the polymer-type polycarboxylic acid, a polyacrylic acid and a polymethacrylic acid can be named. The polyanion also includes a polyester sulfonic acid, a phenolsulfonic acid novolak resin and the like. However, the polyanion is not limited to such a kind.

The dopant may be contained in the solid electrolyte layer in a free form, in an anion form, or in a salt form, and may be contained in a form that the dopant is bonded to the conductive polymer or interacts with the conductive polymer.

A content ratio of the dopant contained in the solid electrolyte layer is, for example, in a range from 10 parts by mass to 1000 parts by mass, inclusive, and may be in a range from 20 parts by mass to 500 parts by mass, inclusive, or in a range from 50 parts by mass to 200 parts by mass, inclusive, with respect to 100 parts by mass of the conductive polymer.

The solid electrolyte layer may be a single layer or may be formed of a plurality of layers. When the solid electrolyte layer is formed of the plurality of layers, the conductive polymers contained in the layers may be the same or different. Further, the dopants included in the layers may be the same or different.

The solid electrolyte layer may further contain a known additive agent and a known conductive material other than the conductive polymer as necessary. Examples of such a conductive material include at least one selected from the group consisting of conductive inorganic materials such as manganese dioxide and TCNQ complex salts.

Note that a layer for improving adhesiveness may be interposed between the dielectric layer and the solid electrolyte layer.

The solid electrolyte layer is formed, for example, by polymerizing a precursor on the dielectric layer using a treatment liquid containing the precursor of the conductive polymer. The polymerization can be performed by at least one of chemical polymerization and electrolytic polymerization. Examples of the precursor of the conductive polymer include monomers, oligomers, prepolymers or the like. The solid electrolyte layer may be formed by attaching a treatment liquid (for example, a dispersion liquid or solution) containing a conductive polymer to the dielectric layer, and then drying the treatment liquid. Examples of the dispersion medium (or solvent) include water, an organic solvent, and a mixture thereof. The treatment liquid may further contain other components (at least one selected from the group consisting of a dopant and an additive agent, and the like).

When the treatment liquid containing the precursor of the conductive polymer is used, an oxidizing agent is used to polymerize the precursor. The oxidizing agent may be contained in the treatment liquid as an additive agent. Further, the oxidizing agent may be applied to the anode body before or after the treatment liquid is brought into contact with the anode body on which the dielectric layer is formed. Examples of such an oxidizing agent include a sulfate, a sulfonic acid, and a salt thereof. One kind of oxidizing agent can be used singly, or two or more kinds of oxidizing agents can be used in combination. As the sulfate, for example, a salt of a sulfuric acid such as ferric sulfate or sodium persulfate or a sulfuric acid group such as persulfuric acid and metal can be named. Examples of the metal constituting the salt include alkali metals (sodium, potassium, and the like), iron, copper, chromium, and zinc. The sulfonic acid or a salt of the sulfonic acid has a function as a dopant in addition to a function as the oxidizing agent. As the sulfonic acid or a salt of the sulfonic acid, a low molecular sulfonic acid or a salt of the low molecular sulfonic acid exemplified as the dopant can be used.

A step of forming the solid electrolyte layer by immersion in the treatment liquid and polymerization (or drying) may be performed once, or may be repeated a plurality of times. In each time, conditions such as the composition and viscosity of the treatment liquid may be the same, or at least one condition may be changed.

(Cathode Lead-Out Layer)

The cathode lead-out layer only needs to include at least a carbon layer that is in contact with the solid electrolyte layer and covers at least a part of the solid electrolyte layer, and may include a carbon layer and a metal-containing layer covering the carbon layer. Examples of the metal-containing layer include at least one selected from a layer containing metal powder and a metal foil. By providing the metal-containing layer, electric charge can be easily extracted from the solid electrolytic capacitor element.

(Carbon Layer)

The carbon layer includes a carbonaceous material and a transition metal ion component. The carbon layer may contain conductive particles (for example, metal powder) other than the carbonaceous material. Further, the content proportion of the transition metal ion component in the carbon layer is 17000 ppm or less on a mass basis. By controlling the content proportion of the transition metal ion component to be low, high conductivity of the solid electrolyte layer can be secured, and initial ESR of the solid electrolytic capacitor can be suppressed to be low. The carbon layer may contain, for example, at least one selected from the group consisting of a polymer component and an additive agent, as necessary.

The carbon layer is formed by, for example, applying a dispersion containing a constituent component of the carbon layer and a liquid medium so as to cover at least a part of the surface of the solid electrolyte layer, and drying the dispersion. The dispersion is generally prepared by wet-pulverizing a constituent component of the carbon layer (specifically, a carbonaceous material, one selected from the group consisting of a binder and an additive agent as necessary, and the like) and a liquid medium with a bead mill. It is considered that metal components (mainly transition metal components) contained in the constituent members (for example, a container, a disk, or a bead) of the bead mill and the like are mixed into the dispersion in the form of ions during the wet pulverization. The transition metal ion component contained in the carbon layer is mainly mixed during the wet pulverization. In the dispersion used for forming the carbon layer, for example, the content proportion of the transition metal ion component can be reduced by using ceramic beads including zirconia beads or the like as beads used for wet pulverization, or by removing the transition metal ion component from the dispersion obtained by wet pulverization. These methods may be combined. The removal of the transition metal ion component may be performed, for example, by bringing an ion exchanger into contact with the dispersion.

Examples of the transition metal ion component include ions of metals belonging to Groups 3 to 11 of the periodic table. Specific examples of the transition metal ions contained in the transition metal ion component include Group 4 metal ions (titanium ions, zirconium ions, etc.), Group 5 metal ions (vanadium ions, niobium ions, etc.), Group 6 metal ions (chromium ions, molybdenum ions, etc.), Group 7 metal ions (manganese ions, etc.), Group 8 metal ions (iron ions, etc.), Group 9 metal ions (cobalt ions, etc.), Group 10 metal ions (nickel ions, etc.), and Group 11 metal ions (copper ions, etc.) in the periodic table. The transition metal ion component may include metal ions of the fourth period to the sixth period of the periodic table, may include metal ions of the fourth period and the fifth period, and may include metal ions of the fourth period. The transition metal ion component may contain one kind of transition metal ions, but often contains two or more kinds of transition metal ions.

In the carbon layer, the valence of each ion of the transition metal ion component contained is not particularly limited. The valence of each transition metal ion may be monovalent or divalent or more.

The transition metal ion component may contain at least one selected from the group consisting of an iron ion, a nickel ion, and a copper ion. These ions easily act as an oxidant, and easily cause oxidation degradation of a conductive polymer. Hence, when the transition metal ion component contains such ions, the effect by controlling the content proportion of the transition metal ion component is more remarkably exhibited.

The content proportion of the transition metal ion component in the carbon layer may be 17000 ppm or less, preferably 15000 ppm or less, 10,000 ppm or less, or 5000 ppm or less on a mass basis. When the content proportion of the transition metal ion component is in such a range, the initial ESR of the solid electrolytic capacitor can be kept low. Furthermore, even when the solid electrolytic capacitor is used for a long period of time or the solid electrolytic capacitor is exposed to a high temperature, an increase in ESR can be significantly reduced. The content proportion of the transition metal ion component in the carbon layer is preferably as small as possible, but it is difficult to set the content proportion to 0 ppm. Thus, the content proportion of the transition metal ion component in the carbon layer is usually more than 0 ppm on a mass basis.

From the viewpoint of suppressing initial ESR and an increase in ESR to a low level, the content proportion of iron ions in the carbon layer is more preferably 5000 ppm or less, still more preferably 4000 ppm or less on a mass basis. Furthermore, when the content proportion (mass basis) of iron ions in the carbon layer is 1500 ppm or less or 1000 ppm or less (preferably 800 ppm or less), the initial ESR can be further suppressed to a low level, and an increase in the ESR can be further reduced even when the solid electrolytic capacitor is used for a long period of time or the solid electrolytic capacitor is exposed to a high temperature.

From the viewpoint of suppressing initial ESR and an increase in ESR to a low level, the content proportion of nickel ions in the carbon layer is more preferably 5000 ppm or less, still more preferably 4500 ppm or less on a mass basis. When the content proportion (mass basis) of nickel ions in the carbon layer is 2500 ppm or less or 2000 ppm or less, the initial ESR can be further suppressed to be low, and an increase in the ESR can be further reduced even when the solid electrolytic capacitor is used for a long period of time or the solid electrolytic capacitor is exposed to a high temperature.

From the viewpoint of suppressing initial ESR and an increase in ESR to a low level, the content proportion of copper ions in the carbon layer is more preferably 150 ppm or less, still more preferably 100 ppm or less on a mass basis. Further, when the content proportion (mass basis) of copper ions in the carbon layer is 30 ppm or less or 15 ppm or less (preferably ppm or less), the initial ESR can be further suppressed to a low level, and an increase in the ESR can be further reduced even when the solid electrolytic capacitor is used for a long period of time or the solid electrolytic capacitor is exposed to a high temperature.

Typical metal ions may be mixed into the carbon layer. Some of the typical metal ions promote the progress of side reactions in the carbon layer and the vicinity thereof (solid electrolyte layer or the like). Thus, from the viewpoint of maintaining high conductivity of the solid electrolyte layer, the carbon layer, and the like, the content proportion of the typical metal ions in the carbon layer is also preferably small. Examples of such a typical metal ion include ions (zinc ions and the like) of Group 12 metal of the periodic table. The carbon layer may contain one kind or two or more kinds of such metal ions.

The total content proportion of typical metal ions (such as Group 12 metal ions of the periodic table) such as zinc ions in the carbon layer is preferably less than 15 ppm, preferably 14 ppm or less, and may be 12 ppm or less on a mass basis. When the content proportion of the typical metal ion is in such a range, it is easy to maintain higher conductivity of the solid electrolyte layer, the carbon layer, and the like. The content proportion of such typical metal ions is usually more than 0 ppm on a mass basis.

When the content proportion of metal ions in the carbon layer is determined from the carbon layer of the solid electrolytic capacitor element, the content proportion can be determined by the following procedure.

A solid electrolytic capacitor is embedded in a curable resin to prepare a sample in which the curable resin is cured. The carbon layer on the capacitor element is exposed by subjecting the sample to polishing, milling, or the like. Transition metal ions contained in the exposed surface of the carbon layer are measured by qualitative analysis by energy dispersive X-ray spectroscopy (EDX). When it is confirmed that the carbon layer contains transition metal ions, a pre-determined amount of sample (sample A) is collected by scraping the carbon layer, and the mass ($m_0$) of sample A is measured. Sample A is mixed with a nitric acid aqueous solution having a concentration of 1.0 mass %, and the mixture is allowed to stand at room temperature (from 20° C. to 35° C., inclusive) for 1 day. The resulting mixture (sample B) is separated into a solid (sample C) and a liquid (sample D) by centrifugation. Using separated liquid sample D, the concentration of metal ions in sample B is determined by inductively coupled plasma (ICP) emission spectrometry. From this concentration and the mass $m_0$, the content proportion of each metal ion in the carbon layer is obtained. For the ICP emission spectrometry, for example, Optima 5300 DV manufactured by Perkin Elmer is used.

Note that sample A is collected from the carbon layer exposed by removing the metal-containing layer. For the purpose of excluding the influence of the metal contained in the metal-containing layer, when the content proportion of metal ions in the carbon layer is obtained, the concentration of ions of metal species other than the metal (for example, silver) contained in the metal-containing layer may be determined.

As the carbonaceous material, a conductive carbonaceous material is usually used. Examples of the carbonaceous material include graphite (artificial graphite, natural graphite, vapor-grown carbon, and the like), carbon black, and amorphous carbon. The carbon layer may include one kind or two or more kinds of carbonaceous materials. The carbonaceous material may be particulate or fibrous, but preferably contains at least particles.

The dispersion for forming the carbon layer is prepared by wet pulverization using a bead mill. Hence, the carbon layer contains a pulverized carbonaceous material. Such carbonaceous materials include, for example, particles that are pulverized and have a relatively small average particle size. An average particle size of such particles is, for example, 10 μm or less, and may be 5 μm or less, 1.5 μm or less, or 1 μm or less. When the carbonaceous material of the carbon layer contains particles having such an average particle size, conductive paths between the particles are easily formed, and high conductivity of the carbon layer is obtained, so that initial ESR can be further suppressed to a low level. Furthermore, high conductivity of the carbon layer is maintained even when the solid electrolytic capacitor is used for a long period of time or the solid electrolytic capacitor is exposed to a high temperature, so that high reliability of the solid electrolytic capacitor element and the solid electrolytic capacitor is easily secured. A lower limit of the average particle size of the particles is not particularly limited, but may be determined so as to be a volume resistance value of the carbon layer, for example, 1.0 Ω·cm or less.

Note that the above average particle diameter refers to a cumulative 50% particle diameter (median diameter) in a volume-based particle size distribution measured using a particle size distribution measuring device of a dynamic light scattering method or a particle size distribution measuring device of a laser diffraction and scattering method.

For example, when the average particle diameter is 10 μm or less, the particle size distribution measuring device of the dynamic light scattering method is used, and when the average particle diameter exceeds 10 μm, the particle size distribution measuring device of the laser diffraction and scattering method is used. As the particle size distribution measuring device by the dynamic light scattering method, for example, a light scattering photometer DLS-8000 manufactured by Otsuka Electronics Co., Ltd. is used. As the particle size distribution measuring device of the laser diffraction and scattering method, for example, MT3200II manufactured by Microtrac is used.

When the average particle size is determined for the carbonaceous material collected from the carbon layer of the solid electrolytic capacitor element, for example, a dispersion containing sample E obtained by the following procedure is used as a sample for measuring the average particle size. First, solid sample C described above is washed with water, washed with an organic solvent, and dried to obtain a carbonaceous material (sample E). As the organic solvent, for example, a solvent capable of dissolving a polymer component that cannot be removed by water washing may be selected from those exemplified as the organic liquid medium of wet pulverization described later. A dispersion for measurement is prepared by dispersing sample E in a liquid dispersion medium using a surfactant. As the dispersion medium, for example, pure water or an organic medium which is liquid at room temperature (for example, 20° C. to 35° C.) is used. Each of the type and concentration of the surfactant, the type of the dispersion medium, and the concentration of sample E in the dispersion may be selected within a range in which a dispersion suitable for measuring the average particle size can be prepared.

The polymer component contained in the carbon layer may be hydrophilic (for example, water solubility and water dispersibility) or hydrophobic. The polymer component may contain one type of polymer or two or more types of polymers.

Examples of the hydrophilic polymer component include a polymer containing at least one hydrophilic group selected from the group consisting of an acid group and a hydroxy group (Hereinafter, the polymer may be referred to as a first polymer.). Among them, the first polymer having an anionic group such as an acid group and a phenolic hydroxy group is preferable. Examples of the acid group include a sulfone group and a carboxy group. When a carbon layer is formed using an aqueous dispersion, the first polymer preferably has a plurality of hydrophilic groups (In particular, a plurality of anionic groups) from the viewpoint of easily securing high dispersibility. As the hydrophilic polymer component, it is preferable to use the first polymer having at least an acid group, and the first polymer having an acid group and a hydroxy group may be used.

Note that, in the carbon layer, the acid group of the polymer may be contained in a free form, may be contained in an anion form, may be contained in a salt form, or may be contained in a state of interacting with or binding to a component contained in the carbon layer or the solid electrolyte layer. In the present specification, an acid group in all of these forms may be simply referred to as an "acid group". Furthermore, in the carbon layer, the hydroxy group of the polymer may be contained in a free form, may be contained in an anion form, or may be contained in a state of interacting with or binding to a component contained in the carbon layer or the solid electrolyte layer. In the present specification, the hydroxy group in all of these forms may be simply referred to as a "hydroxy group". Furthermore, similarly, the anionic group may be simply referred to as an "anionic group" including anionic groups in all forms of a free form, an anion form, a salt form, and a state of interacting with or binding to a component contained in the carbon layer or the solid electrolyte layer.

The carbon layer may contain one kind or two or more kinds of the first polymer.

When a polymer anion containing a monomer unit having an anionic group is used as the first polymer, the effect of suppressing dedoping from the solid electrolyte layer is enhanced. Thus, even when the solid electrolytic capacitor is used for a long period of time or the solid electrolytic capacitor is exposed to a high temperature, high conductivity of the solid electrolyte layer is maintained, and an increase in ESR can be suppressed to a low level. Such a polymer anion may be referred to as polymer 1A. Examples of polymer 1A include a homopolymer having a monomer unit having an anionic group, a copolymer containing two or more kinds of monomer units having an anionic group, and a copolymer of a monomer unit having an anionic group and another copolymerizable monomer. The monomer unit having an anionic group may be aliphatic and may have at least one ring selected from the group consisting of an aliphatic ring, an aromatic ring, and a heterocyclic ring. The polymer component may contain one kind or two or more kinds of polymers 1A.

Examples of the polymer anion having a sulfone group include polyvinylsulfonic acid, polystyrenesulfonic acid, polyallylsulfonic acid, polyacrylsulfonic acid, polymethacrylsulfonic acid, poly (2-acrylamide-2-methylpropanesulfonic acid), polyisoprenesulfonic acid, polyestersulfonic acid, and phenolsulfonic acid novolac resin. Examples of the polymer anion having a carboxy group include a copolymer using at least one of polyacrylic acid, polymethacrylic acid, acrylic acid, and methacrylic acid. The copolymer also includes a copolymer of at least one of acrylic acid and methacrylic acid and at least one of an acrylic acid ester and a methacrylic acid ester (methyl acrylate, methyl methacrylate, etc.). However, the polymer anion is not limited thereto. These polymer anions are usually water-soluble.

As the first polymer, a water-soluble cellulose derivative, a saponified product of polyvinyl acetate (partially saponified product, polyvinyl alcohol, etc.), and the like are also preferable. Examples of the water-soluble cellulose derivative include a cellulose ether compound. Examples of the cellulose ether compound include carboxymethyl cellulose salts (alkali metal salts such as sodium salts and potassium salts, ammonium salts, and the like), hydroxyethyl cellulose, hydroxypropyl methyl cellulose, and the like. These first polymers may be referred to as polymer 1B. Polymer 1B easily forms a hydrogen bond with an organic molecule (specifically, a polymer) contained in the carbon layer, thereby easily forming a dense structure. Thus, a space for gas such as oxygen to diffuse into the polymer component is small, and the gas hardly permeates. Hence, when the polymer component contains polymer 1B, the oxygen barrier property of the carbon layer can be enhanced, and the adhesion between the solid electrolyte layer and the carbon layer and the adhesion between carbonaceous materials can be enhanced. Therefore, oxidation degradation of the conductive polymer can be reduced, and conductivity of the solid electrolyte layer can be easily maintained. Furthermore, when polymer 1B is used, a moderate thickening effect is obtained, so that the dispersibility of the constituent components in the dispersion is easily enhanced. The polymer component may contain one kind or two or more kinds of polymers 1B. The polymer component may include polymer 1A and polymer 1B.

The weight-average molecular weight Mw of the first polymer is, for example, from 2000 to 1 million, inclusive.

Examples of the polymer other than the first polymer include a fluororesin, an acrylic resin (polyacrylic acid ester or the like), a polyester resin, a polyurethane resin, a vinyl resin (polyvinyl acetate or the like), a polyolefin resin, a rubber-like material (for example, styrene-butadiene copolymer rubber (SBR)), and an epoxy resin. Examples of the fluororesin include a vinylidene fluoride resin (polyvinylidene fluoride, vinylidene fluoride copolymer, and the like) and a fluorinated olefin resin (polytetrafluoroethylene, tetrafluoroethylene-hexafluoropropylene copolymer, tetrafluoroethylene-ethylene copolymer, etc.). Such a polymer may be referred to as a second polymer. The polymer component may contain one type or two or more types of the second polymer. The polymer component may contain the first polymer and the second polymer as necessary. The second polymer acts as a binder. Among the second polymers, when a fluororesin is used, adhesion of the dispersion to the solid electrolyte layer can be improved, so that adhesion between the solid electrolyte layer and the carbon layer can be improved. Furthermore, when the fluororesin is used, the dispersibility of the constituent components in the dispersion is easily improved.

The second polymer is hardly dissolved in water, and a dispersion is usually prepared in combination with an organic liquid medium. However, the present invention is not limited to this case, and if necessary, water or a mixed medium of water and an organic liquid medium may be used for preparing a dispersion containing the second polymer. The second polymer may be a thermoplastic resin or a curable resin (thermosetting resin, photocurable resin, and the like). In the curable resin, a monomer component may be used as a liquid medium. The polymer component may contain one type or two or more types of the second polymer.

The content ratio of the polymer component in the carbon layer can be selected from a wide range, for example, from 0.1 parts by mass to 5000 parts by mass, inclusive, and may be from 0.5 parts by mass to 1000 parts by mass, inclusive, with respect to 100 parts by mass of the carbonaceous material.

A content ratio of the first polymer is, for example, from 1 part by mass to 5000 parts by mass, inclusive, may be from 2 parts by mass to 1000 parts by mass, inclusive, or may be from 10 parts by mass to 100 parts by mass, inclusive, with respect to 100 parts by mass of the carbonaceous material. From the viewpoint of easily securing workability, a content ratio of polymer 1B is preferably 10 parts by mass or less with respect to 100 parts by mass of the carbonaceous material. Furthermore, when the polymer component contains polymer 1A and polymer 1B, the content ratio of polymer 1B is, for example, from 5 parts by mass to 50 parts by mass, inclusive, and may be from 5 parts by mass to 35 parts by mass, inclusive, with respect to 100 parts by mass of polymer 1A.

The content ratio of the second polymer in the carbon layer is, for example, 10 parts by mass or less, may be from 0.1 parts by mass to 10 parts by mass, inclusive, or may be from 0.5 parts by mass to 5 parts by mass, inclusive, with respect to 100 parts by mass of the carbonaceous material.

Examples of the additive agent contained in the carbon layer include, but are not limited to, at least one selected from the group consisting of an aromatic compound having a sulfonate group, a thickener, a surface conditioner, and a surfactant. Note that, when the carbon layer contains an aromatic compound having a sulfonate group, adhesion between the solid electrolyte layer and the carbon layer can be further enhanced, and dedoping in the solid electrolyte layer can be reduced.

Examples of the aromatic compound having a sulfonic acid group include aromatic sulfonic acids. The aromatic sulfonic acid may include, in addition to a sulfonic acid group, at least one selected from the group consisting of a hydroxy group and a carboxy group. In the carbon layer, the sulfonic acid group, the carboxy group, and the hydroxy group of the aromatic compound may be contained in any form described for the polymer component.

Examples of the aromatic sulfonic acid include benzenesulfonic acid, p-toluenesulfonic acid, naphthalenesulfonic acid, butylnaphthalenesulfonic acid, phenolsulfonic acid, sulfosalicylic acid, hydroquinone sulfonic acid, hydroquinone disulfonic acid, catechol sulfonic acid, catechol disulfonic acid, pyrogallol sulfonic acid, pyrogallol disulfonic acid, and salts thereof (for example, alkali metal salts (sodium salt, potassium salt, etc.)). The aromatic compound having a sulfonic acid group also includes a condensation product of an aromatic sulfonic acid with an aldehyde compound (such as formaldehyde or a multimer thereof (such as trioxane)). Specific examples of the condensation product include a phenol sulfonic acid formaldehyde condensate, a naphthalene sulfonic acid formaldehyde condensate, an aryl phenol sulfonic acid formaldehyde condensate, an anthraquinone sulfonic acid formaldehyde condensate, and salts thereof (for example, alkali metal salts (sodium salt, potassium salt, etc.)). However, the aromatic compound having a sulfonate group is not limited thereto.

The carbon layer may include one kind or two or more kinds of aromatic compounds having a sulfonic acid group.

In the carbon layer, a content ratio of the aromatic compound having a sulfonate group is, for example, from 4 parts by mass to 300 parts by mass, inclusive, with respect to 100 parts by mass of the carbonaceous material.

A thickness of the carbon layer is, for example, in a range from 0.1 µm to 100 µm, inclusive, may be in a range from 0.5 µm to 50 µm, inclusive, or may be in a range from 1 µm to 20 µm, inclusive.

Examples of the ceramic beads used for wet pulverization in preparing the dispersion include zirconia beads, zirconia silica-based ceramic beads, titania beads, alumina beads, sialon beads, and silicon nitride beads. The ceramic beads have a smooth surface, are less likely to damage containers, disks, and the like of the mill, and are advantageous for reducing contamination of the metal ion component into the dispersion. Note that, although the ceramic beads may contain a metal component such as a transition metal, even if the constituent components of the ceramic beads are mixed in the dispersion, the content proportion of the metal ion component is much smaller than that in the case of using stainless steel beads.

As the ion exchanger for removing ions from the dispersion, for example, an inorganic exchanger may be used, but the content proportion of the transition metal ion component can be easily reduced by using an ion exchange resin (cation exchange resin or the like). If necessary, the inorganic ion exchanger and the ion exchange resin may be used in combination.

A liquid medium is used for wet pulverization. Examples of the liquid medium include water, an organic liquid medium, and a mixture of water and an organic liquid medium (water-soluble organic liquid medium or the like). Note that the liquid medium may have fluidity at room temperature (a temperature from 20° C. to 35° C., inclusive).

Examples of the organic liquid medium include alcohols (for example, ethanol, 2-propanol), ethers (for example, diethyl ether, tetrahydrofuran), ketones (acetone and the like), nitriles (acetonitrile and the like), sulfoxides (dimethyl sulfoxide and the like), and N-methyl-2-pyrrolidone. The organic liquid medium may be used singly or in combination of two or more kinds thereof.

The carbon layer can be formed by immersing an anode body having a dielectric layer on which a solid electrolyte layer is formed in a liquid dispersion, applying a paste-like dispersion to a surface of the solid electrolyte layer, and drying the dispersion.

(Metal-Containing Layer)

Among the metal-containing layers, the layer containing metal powder can be formed, for example, by laminating a composition containing metal powder on a surface of the carbon layer. As such a metal-containing layer, for example, a metal paste layer formed using a composition containing metal powder such as silver particles and a resin (binder resin) can be used. As the resin, although a thermoplastic resin can be used, a thermosetting resin such as an imide resin or an epoxy resin is preferably used.

Among the metal-containing layers, a type of the metal that constitutes the metal foil is not particularly limited, but it is preferred to use a valve metal such as aluminum, tantalum, or niobium, or an alloy containing a valve metal. If necessary, a surface of the metal foil may be roughened by etching treatment or the like. On the surface of the metal foil may be provided an anodization film, a film of a metal (different type of metal) different from the metal that constitutes the metal foil, or a nonmetal film. Examples of the different type of metal include metals such as titanium. Examples of the nonmetal material include carbon (conductive carbonaceous material or the like) and the like.

A thickness of the metal-containing layer is, for example, in a range from 0.1 μm to 100 μm, inclusive, may be in a range from 0.5 μm to 50 μm, inclusive, or may be in a range from 1 μm to 20 μm, inclusive.

(Others)

The solid electrolytic capacitor may be a wound type, or may be either a chip type or a stacked type. For example, the solid electrolytic capacitor may include a stack body of two or more capacitor elements. The configuration of the capacitor element may be selected in accordance with the type of the solid electrolytic capacitor.

In the capacitor element, one end part of the cathode terminal is electrically connected to the cathode lead-out layer. For example, a conductive adhesive is applied to the cathode layer, and the cathode terminal is bonded to the cathode layer via the conductive adhesive. One end part of the anode terminal is electrically connected to the anode body. The other end part of the anode terminal and the other end part of the cathode terminal are drawn out from a resin exterior body or a case. The other end part of each terminal exposed from the resin exterior body or the case is used for, for example, solder connection to a substrate on which the solid electrolytic capacitor is to be mounted.

The capacitor element is sealed using the resin exterior body or a case. For example, a material resin (for example, uncured thermosetting resins and fillers) of the capacitor element and the exterior body may be housed in a mold, and the capacitor element may be sealed with the resin exterior body by a transfer molding method, a compression molding method, or the like. At this time, a part on the other end part side of each of the anode terminal and the cathode terminal connected to the anode lead drawn out from the capacitor element is exposed from the mold. Further, the solid electrolytic capacitor may be formed by housing the capacitor element in a bottomed case such that a part on the other end part side of each of the anode terminal and the cathode terminal is positioned on an opening side of the bottomed case, and sealing the opening of the bottomed case with a sealing body.

FIG. 1 is a cross-sectional view schematically illustrating a structure of a solid electrolytic capacitor according to a first exemplary embodiment of the present disclosure. As illustrated in FIG. 1, solid electrolytic capacitor 1 includes capacitor element 2, resin exterior body 3 that seals capacitor element 2, and anode terminal 4 and cathode terminal 5 that are each at least partially exposed to an outside of resin exterior body 3. Anode terminal 4 and cathode terminal 5 can be made of metal such as copper or a copper alloy. Resin exterior body 3 has a substantially rectangular parallelepiped outer shape, and solid electrolytic capacitor 1 also has a substantially rectangular parallelepiped outer shape.

Capacitor element 2 includes anode body 6, dielectric layer 7 covering anode body 6, and cathode body 8 covering dielectric layer 7. Cathode body 8 includes solid electrolyte layer 9 covering dielectric layer 7, and cathode lead-out layer 10 covering solid electrolyte layer 9, and constitutes the cathode part described above. In the illustrated example, cathode lead-out layer 10 includes carbon layer 11, and metal paste layer 12 as a metal-containing layer. According to the present disclosure, the content proportion of the transition metal ion component in carbon layer 11 is low. Thus, oxidation degradation of the conductive polymer is suppressed, so that a decrease in conductivity of the solid electrolyte layer is suppressed, and thus initial ESR of the solid electrolytic capacitor can be suppressed low.

Anode body 6 includes a region facing cathode body 8, and a region not facing cathode body 8. In a region of anode body 6 that does not face cathode body 8, insulating separation layer 13 is formed in a part adjacent to cathode body 8 so as to cover a surface of anode body 6 in a band shape, and contact between cathode body 8 and anode body 6 is restricted. In the region of anode body 6 that does not face cathode body 8, another part is electrically connected to anode terminal 4 by welding. Cathode terminal 5 is electrically connected to cathode body 8 via adhesive layer 14 formed of a conductive adhesive.

EXAMPLE

Hereinafter, the present invention is specifically described with reference to examples and comparative examples, but the present invention is not limited to the following examples.

<<Solid Electrolytic Capacitor E1>>

Solid electrolytic capacitor 1 (solid electrolytic capacitor E1) illustrated in FIG. 1 was produced in the following manner, and the characteristics thereof were evaluated.

(1) Preparation of Anode Body 6

Both surfaces of an aluminum foil (thickness: 100 μm) as a base material were roughened by etching to prepare anode body 6.

(2) Formation of Dielectric Layer 7

A part on the other end part side of anode body 6 was immersed in an anodizing solution, and a DC voltage of 70 V was applied for 20 minutes to form dielectric layer 7 containing aluminum oxide.

(3) Formation of Solid Electrolyte Layer 9

An aqueous solution containing a pyrrole monomer and p-toluenesulfonic acid was prepared. A monomer concentration in this aqueous solution was 0.5 mol/L, and a concentration of p-toluenesulfonic acid was 0.3 mol/L.

Anode body 6 on which dielectric layer 7 was formed in the above (2) and a counter electrode were immersed in the obtained aqueous solution, and electrolytic polymerization was performed at a polymerization voltage of 3 V (polymerization potential with respect to a silver reference electrode) at 25° C. to form solid electrolyte layer 9.

(4) Formation of Cathode Body 8

Graphite particles as a carbonaceous material and a dispersion material (cellulose derivative or the like) were wet-pulverized together with water using a bead mill (SC Mill manufactured by NIPPON COKE & ENGINEERING CO., LTD.) to prepare a liquid dispersion. As the beads, zirconia beads were used. A mass ratio of the graphite particles to the dispersion material was 100:50.

Anode body 6 on which solid electrolyte layer 9 obtained in the above (3) was formed was immersed in the liquid dispersion, taken out from the dispersion, and then dried to form carbon layer 11 at least on the surface of solid electrolyte layer 9. Drying was carried out at a temperature ranging from 150° C. to 200° C. for 10 minutes to 30 minutes.

Next, a silver paste containing silver particles and a binder resin (epoxy resin) was applied onto the surface of carbon layer 11, and heated at 150° C. to 200° C. for 10 minutes to 60 minutes to cure the binder resin, thereby forming metal paste layer 12. Cathode body 8 composed of carbon layer 11 and metal paste layer 12 was thus formed.

Capacitor element 2 was produced as described above.

(5) Assembly of Solid Electrolytic Capacitor 1

Cathode body 8 of capacitor element 2 obtained in the above (4) was bonded to one end part of cathode terminal 5 with adhesive layer 14 of a conductive adhesive. One end part of anode body 6 protruding from capacitor element 2 and one end part of anode terminal 4 were joined by laser welding.

Subsequently, resin exterior body 3 made of an insulating resin was formed around capacitor element 2 by molding. At this time, the other end part of anode terminal 4 and the other end part of cathode terminal 5 were drawn out from resin exterior body 3. Thus, a solid electrolytic capacitor was completed. In the same manner as described above, 20 pieces of solid electrolytic capacitors in total were prepared.

(6) Evaluation

The following evaluation was performed using the solid electrolytic capacitors.

(a) Measurement of Metal Ion Content Proportion in Carbon Layer

The content proportion of metal ions in the carbon layer was measured by the procedure described above.

(b) Measurement of ESR

ESR of the solid electrolytic capacitor was measured by the following procedure.

The initial ESR (mΩ) of each solid electrolytic capacitor at a frequency of 100 kHz were measured using an LCR meter for 4-terminal measurement under an environment of 20° C. Then, an average value (initial ESR) of the 20 solid electrolytic capacitors was obtained.

Next, the solid electrolytic capacitor was subjected to an acceleration test by applying a rated voltage to the solid electrolytic capacitor for 500 hours under an environment of 145° C. Thereafter, ESR was measured in an environment at 20° C. in the same manner as in the initial ESR, and an average value of the 20 solid electrolytic capacitors (ESR after the acceleration test) was obtained.

<<Solid Electrolytic Capacitor E2>>

In formation (4) of cathode body 8 of solid electrolytic capacitor E1, a strip-shaped cation exchange resin was added to the obtained liquid dispersion, mixed for 1 hour, and then a cation exchange resin was taken out. In this way, a liquid dispersion was prepared. Solid electrolytic capacitor 1 (solid electrolytic capacitor E2) was manufactured in the same manner as in the case of solid electrolytic capacitor E1 except for using the obtained liquid dispersion, and evaluation was performed.

<<Solid Electrolytic Capacitor C1>>

In formation (4) of cathode body 8 of solid electrolytic capacitor E1, stainless steel beads were used as the beads. Solid electrolytic capacitor C1 was manufactured and evaluated in the same manner as in the case of solid electrolytic capacitor E1 except for this.

Results of the initial ESR and the ESR after the acceleration test for 500 hours of the prepared solid electrolytic capacitors are shown in Table 1. The ESR is expressed as a relative value when the initial ESR of solid electrolytic capacitor E1 is 1.

TABLE 1

|  | C1 | E1 | E2 |
|---|---|---|---|
| Transition metal ion | Content proportion in carbon layer (mass ppm) | | |
| Fe | 6507.62 | 3574.25 | 606.37 |
| Ni | 6161.49 | 4229.68 | 1667.92 |
| Cu | 123.98 | 69.90 | 4.76 |
| Cr | 2314.48 | 1167.11 | 4.89 |
| Mo | 9381.21 | 5646.09 | 8.02 |
| Mn | 136.84 | 91.84 | 7.21 |
| Ti | 69.75 | 38.71 | 28.39 |
| Total transition metal ions | 24695.37 | 14817.59 | 2327.57 |
| Typical metal ion | Content proportion in carbon layer (mass ppm) | | |
| Zn | 15.29 | 12.82 | 9.98 |
| Initial ESR | 1.68 | 1.00 | 0.80 |
| ESR after acceleration test | 16.00 | 6.78 | 1.25 |

According to the present disclosure, the initial ESR of the solid electrolytic capacitor can be kept low. Furthermore, an increase in ESR can be suppressed to a low level when the solid electrolytic capacitor is used for a long period of time or when the solid electrolytic capacitor is exposed to a high temperature. Hence, the solid electrolytic capacitor element and the solid electrolytic capacitor can be used for various applications in which high reliability is required.

The invention claimed is:

1. A solid electrolytic capacitor element comprising:
an anode body;
a dielectric layer disposed on a surface of the anode body;
a solid electrolyte layer covering at least a part of the dielectric layer; and
a cathode lead-out layer covering at least a part of the solid electrolyte layer, wherein:
the cathode lead-out layer includes a carbon layer that is in contact with the solid electrolyte layer and covers the at least the part of the solid electrolyte layer,
the carbon layer includes a carbonaceous material and a transition metal ion component, and
a content proportion of the transition metal ion component in the carbon layer is 17000 ppm or less on a mass basis.

2. The solid electrolytic capacitor element according to claim 1, wherein:
the transition metal ion component includes iron ions, and
a content proportion of the iron ions in the carbon layer is 5000 ppm or less on a mass basis.

3. The solid electrolytic capacitor element according to claim 1, wherein:
the transition metal ion component includes nickel ions, and
a content proportion of the nickel ions in the carbon layer is 5000 ppm or less on a mass basis.

4. The solid electrolytic capacitor element according to claim 1, wherein:
the transition metal ion component contains copper ions, and
a content proportion of the copper ions in the carbon layer is 150 ppm or less on a mass basis.

5. The solid electrolytic capacitor element according to claim 1, wherein the carbonaceous material includes particles having an average particle size of 10 μm or less.

6. The solid electrolytic capacitor element according to claim 1, wherein the carbon layer contains a polymer including at least one selected from the group consisting of an acid group and a hydroxy group.

7. The solid electrolytic capacitor element according to claim 1, wherein the carbon layer contains a fluororesin.

8. A solid electrolytic capacitor comprising the solid electrolytic capacitor element according to claim 1.

* * * * *